Jan. 19, 1960 W. MENKE 2,921,794

RECORD CHANGER

Filed July 6, 1956 2 Sheets-Sheet 1

United States Patent Office 2,921,794

Patented Jan. 19, 1960

2,921,794

RECORD CHANGER

Wilhelm Menke, Bingen, Germany, assignor to NSM-Apparatebau G.m.b.H., Braunschweig, Germany Application July 6, 1956, Serial No. 596,363

Claims priority, application Germany July 9, 1955

3 Claims. (Cl. 274—10)

This invention relates to record disc changing devices and more particularly to a push-button semi-automatic record changer.

In the design of phonograph equipment, quality performance is not automatically assured by choosing better-grade components for the playback mechanism.

Phonographs have been developed in which attempts have been made to maintain fidelity of reproduction by controlling the stylus-pressure through various means controlling the bearing pressure of the tonearm. However, the problem of holding a number of records in a stack in a manner avoiding slippage between the records and pressure changes between the tonearm and records as they are played has consistently been a problem. The problem is particularly acute in playback mechanisms where the underside of the yet unplayed records is played. The tonearm bearing pressure varies as the record discs above it are reduced so that when the final record disc is played the weight of the discs is at a minimum and the relative pressure between the disc and the tonearm is different than when the entire stack of records was initially above the tonearm. Accordingly, calibrated tonearms are ineffective in maintaining a constant uniform pressure. Attempts have been made to solve the problem by placing a weight on the uppermost record of a stack of records or by having an extension spring bearing on the uppermost record disc in an attempt at maintaining a constant relative pressure between the record disc being played and the stylus. These techniques have not been totally satisfactory in that the relative pressure between stylus and record discs is still subject to a wide variation.

The invention has a principal object to overcome the limitations stated above and to provide a relatively simple and inexpensive device for automatically maintaining a constant stylus pressure.

Another object is to maintain a constant stylus pressure so as to eliminate deformation of groove-walls, echoes, ghosts and other distortions.

Still another object is to maintain highest tracing and tracking efficiency of the tonearm and eliminate simple oscillations of the tonearm.

Still another object is to maintain a constant pressure so as to maintain the sensitivity of the pivoting tonearm.

Another object is to maintain flawless reproduction fidelity.

Some features of the device in accordance with the invention are that the record changer is provided with means for playing the upperside of a record disc below the level of a tonearm and the underside of a record above the level of the tonearm. The changer is provided with a record disc holder having means overlying the uppermost record disc of the unplayed records above the level of the tonearm to keep the record disc having its underside being played subject to the entire weight of the initial stack of record discs so as to hold the records firmly with a constant uniform pressure particularly as the number of unplayed records decreases. Thus reproduction distortion due to slippage as the number of records above the tonearm decreases is eliminated. The record changer is made so as to keep a constant spatial relationship between the tonearm and the records being played so as to permit the tonearm to maintain a constant and uniform stylus-pressure.

Figures 1, 2:
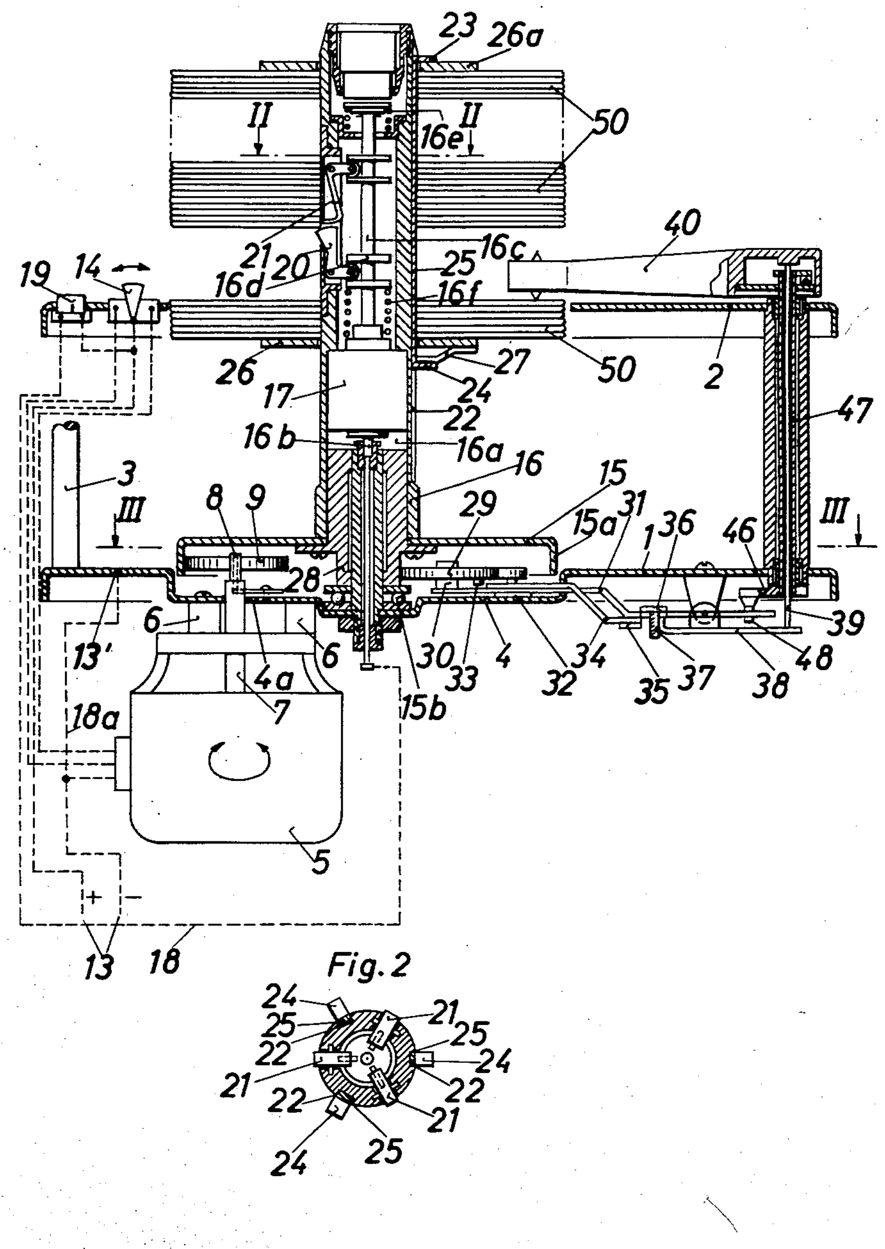
Fig. 1 is a medium vertical sectional view of a record changer in accordance with the invention.
Fig. 2 is a fragmentary horizontal cross-sectional view taken on line II of Fig. 1.

The embodiment of the invention shown in Figs. 1 to 4 has a lower chassis plate 1 and an upper chassis plate 2 fixed in spaced relationship one above the other and held in position by a plurality of spacing bars or columns 3. The record changer is mounted in a cabinet (not shown) by means of the chassis plate 1.

The chassis plate 1 has a central portion that is recessed downwardly so as to form a depression 4. An electric motor 5 having windings for reversing the polarity of the field and thereby capable of rotating in either direction, is securely mounted on the lower side of recessed portion 4 of the plate 1 by resilient means, as for example, shock absorbers 6. The shaft 7 of the motor 5 extends upwardly through an opening **4*a* in the chassis plate 1 and carries a driving pinion 8 which engages two friction wheels 9 (Figs. 1 and 3) each of which is rotatably mounted on individual levers 10** by means of pins *9a*. The levers 10 are pivotally mounted on the chassis plate 1 by means of pins 11. The levers 10 carrying discs 9 are urged towards the pinion 8 by springs 12 so as to keep the friction discs 9 in constant engagement with the pinion 8 driven by the motor 5. The friction discs 9 are positioned internally of a downwardly projecting rim **15*a* of a driving drum 15 and are in constant engagement with the inner periphery of the rim of the driving drum. The driving drum 15 is rotatably mounted on bearing means 15*b* and carries a central upwardly projecting spindle or column 16** adapted to receive a stack of record discs.

The electric motor 5 is connected to a power source (not shown) at terminals 13 and is provided with electrical connections to a switch 14 having an off position and two on positions such that when it is moved to the left or the right it causes the motor to rotate in clockwise or counter-clockwise directions respectively. The electrical connections for the motor is grounded to the chassis plate 1 at a point 13′ as shown.

The record disc stack column 16 is provided with an internal bore **16*a* in which is mounted an electro-magnet 17 having electrical connection means 16*b* connected to a line 18 which is connected to a push-button 19. The push-button 19 is connected to the power source as shown. The armature of the electromagnet 17 is connected with a shaft 16*c* axially positioned in the internal bore 16*a* and carrying spaced pairs of rings 16*d*. The shaft 16*c* is movable axially in the bore 16*a* and is urged into an upward position by springs 16*e* and 16*f* and moved downwardly by the electromagnet when the latter is energized. The rings 16*d* engage pivotally mounted locking lugs or pawls 20 and catching hooks or lugs 21. In this manner when the push button is depressed the electromagnet is energized and the shaft 16*c* is moved downwardly so as to actuate lugs 20 and 21** to release and drop a record disc.

The stack column 16 is further provided with at least three longitudinal grooves 22 equally spaced on the outer periphery of the column 16 and extending substantially the full vertical length of said column (Figs. 1 and 2). The grooves 22 serve as guide means for a plurality of bars or rails 25 each of which is bent at either end so as to have the end portions extending radially and outwardly from the bearing column 16 so as to comprise extensions or hooks 23 and 24. The bars 25 are adapted to slide axially along the stack column 16 and are of such a thickness as to substantially fill the groove so as to have the outer surface flush with the outer periphery of the stack or supporting column 16. The rails or bars 25 are connected at their lower ends to a record supporting plate or turntable 26, the lower radial extensions 24 of the bars 25 being shown connected to the plate 26 resiliently by blade springs 27. The upper hooks 23 of the bars 25 can bear directly on the uppermost record of a stack but preferably a removable upper record plate 26*a* is interposed between the hooks 23 and upper record. In this manner the bars 25 and the record plates 26 and 26*a* comprise a record stack holder movable axially along the grooves 22 in the column 16. The entire record holder assembly is removable from the column 16 by being slipped upwardly off the upper end of the column. When the record holder is thus removed, the upper ends of the bars 25 can be sprung radially inwardly to release and permit the removal of the upper plate 26*a* and the records.

Figure 3:
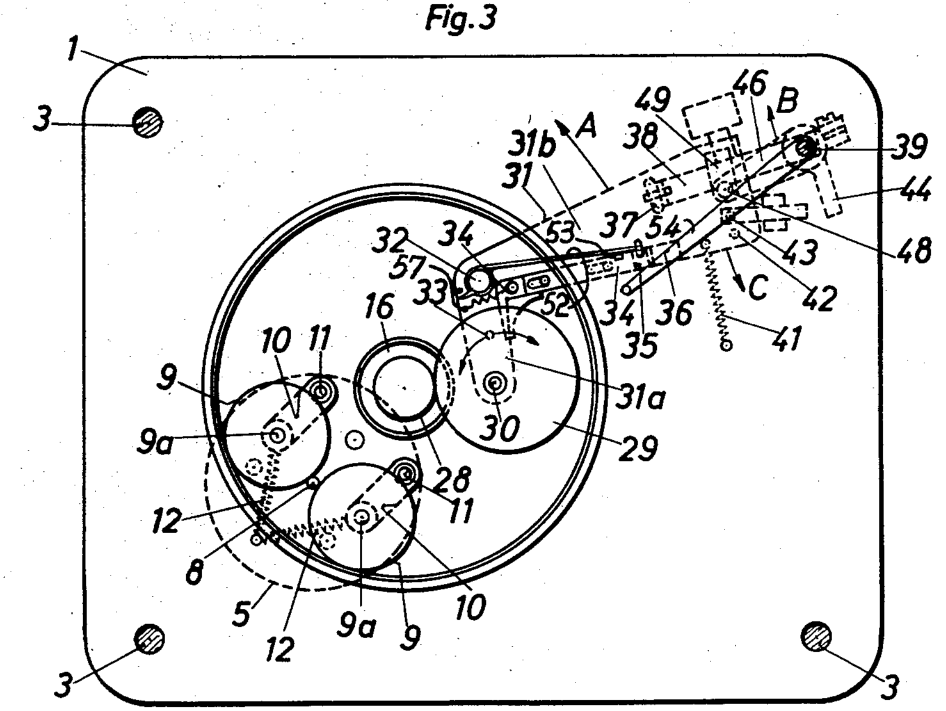
Fig. 3 is a horizontal sectional view taken on line III—III of Fig. 1 showing the drive for the turntable and the tonearm mechanism.
Figure 4:
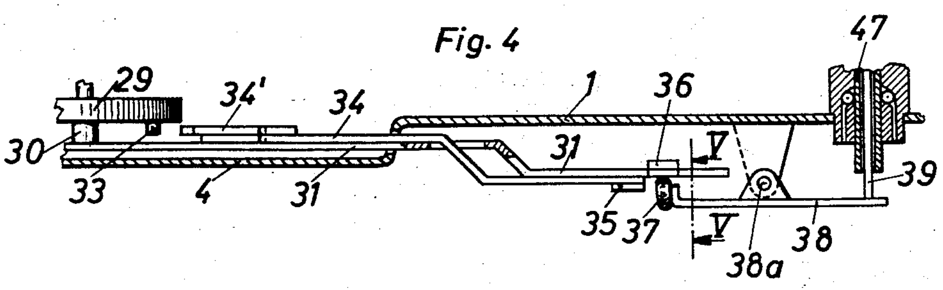
Fig. 4 is an enlarged partial view of the tonearm mechanism shown in Fig. 1.
Figure 5:
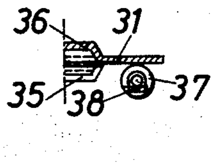
Fig. 5 is a fragmentary sectional view taken on the line V—V of Fig. 4.

The lower portion of the column comprises a friction wheel 28 engaging and cooperating with an eccentric friction wheel 29. The friction wheel 29 is eccentrically mounted on an axis of rotation provided by pin 30 carried by a shorter arm 31*a* of a two-arm locking lever 31 pivotally mounted on the depressed portion 4 of the lower chassis plate 1 by means of a pin 32. The friction disc 29 is provided with a stud or pin 33 fixed on the underside of said disc 29 (Figs. 3 and 4). The longer arm 31*b* of the lever 31 carries a slide 34 having a spring catch 34' normal to the slide at the end adjacent the friction disc 29. The spring catch 34' is in the path of rotation of the revolving pin 33 being intermittently engaged by said pin so as to move slide 34 longitudinally in either direction depending upon the direction of rotation of friction wheel 29. The slide 34 has the end portion carrying the catch 34' substantially in the same plane as the revolving pin 33 with the central portions bent downwardly so that the end portion opposite the catch 34' is at a lower plane. The outer and lower portion of slide 34 is provided with a cam projecting loop portion 35 extending downwardly from the slide. A second cam portion 36 extending upwardly to the two-arm locking lever 31 and lies in the path of a roller 37. The projections 35 and 36 are in substantially different vertical planes so that the lower projection 35 is offset from the upper projecting loop 36 (Fig. 4). A roller 37 rotatably mounted on the end of a tipping or rocking lever 38 pivotally mounted on the chassis plate 1 by means of axis 38*a* is adapted to engage the lower face of lever 31 and, when the lever 31 is swung, the roller 37 engages either downwardly projecting loop 35 or upwardly projecting loop 36 depending on the portion of the slide 34. The end of the lever 38 opposite to the end carrying the roller 37 engages and cooperates with a lifting plunger 39 which lifts and lowers the tonearm 40 which is rotatably mounted in the chassis plates 1 and 2. When the roller engages the lever 31 as shown in Figs. 3 and 4, the tonearm is in an intermediate position. When the lever is swung in a counter-clockwise direction with the slide 34 in the inner position as shown, the roller 37 rides up in the loop 36 and lowers the tonearm. When the slide 34 has been pushed outwardly by engagement of the catch 34 with pin 33 on disc 29 and the lever 31 is swung counter-clockwise, the roller 37 rides down on loop 35 and raises the tonearm.

The friction disc 29 is urged into constant engagement with the friction wheel or lower portion 28 of the bearing column 16 by means of a tension spring 41 connected at one end to the pivotally mounted lever 31 and fixed at the other end to the chassis plate 1. The lever 31 is also provided with a stop 42 engaging and cooperating with a latch 43 in the manner later described. The latch 43 comprises a two-arm rocking lever intermittently cooperating with an arm 44 of an agle lever 46 fixed to the turntable tonearm 40 by means of a sleeve 47 so as to swing with said tonearm. The other arm of lever 46 is provided with a pin 47 extending downwardly and engaging a slot 49 provided in the lever 31.

When it is desired to operate the device the record holder comprising bars 25 and plates 26 and 26*a* are slid up off of or to the top of the column 16 and the plate 26*a* is removed by springing the upper ends of bars 25 inwardly. The desired number of records are then slipped down over the bars 25 and the plate 26*a* is replaced. The bars 25 comprising the stack holder are positioned so as to engage individual longitudinal grooves 22 of the column 16 and slide downwardly until the locking catches or pawls 20 engage the lowermost record of the stack and limit any further downward movement of the stack of records.

By depressing the push-button 19 and energizing the electro-magnet 17 the locking lugs 20 and catching lugs 21 are reciprocated so as to drop onto the record plate 26 the record about to be played. By repeated operation of the push-button, record discs may be selected sequentially. By positioning the switch 14 to the right or to the left, a record lowered on to the record plate 27 may be played or the underside of the lowermost record held by the lugs 20 may be played selectively by moving the tone-arm downwardly and upwardly in a manner later discussed herein.

As heretofore mentioned the electric motor 5 rotates either in a clockwise or counter-clockwise direction depending upon the position of the switch 14. As the motor shaft 7 rotates pinion 8 carried by the shaft engages both friction discs 19 so as to rotate them. However, only one of the discs 9 will engage the inner periphery of the rim of the driving drum 15. The pinion 8 is so positioned with respect to the inner edge or periphery of the drum 15 so that only one disc 9 engages the rim of the disc 15 with a wedging action while the other follows idly, depending upon the direction or rotation of the pinion 8. Since the driving drum 15 carries the stack holding or bearing column 16, the lower portion comprising friction wheel 28 rotates the friction disc 29.

In Fig. 3 the disc 29 is shown engaging the friction wheel portion 28 at a peripheral point lying on the shortest radius of the friction wheel 29. As the disc 29 begins to rotate, in either direction, the lever 31 is moved laterally in the direction shown by the arrow A. Movement of the lever 31 causes the edge portion of the slot 49 to engage the pin 48 so as to move the lever 46 in the direction shown by the arrow B thus moving the tonearm 40, fixed to the sleeve 47, into a starting position for playing a record. Depending upon the direction of rotation of the motor and thus the disc 29, the slide 34 is moved by the interaction of the spring catch 34' and the pin 33 either so as to cause the lower loop 35 or upper loop 36 of the slide 34 to be moved into the transverse path of the roller 37. When the lever 31 is swung in the direction of the arrow A, depending upon the position of the slide 34, the roller 37 either engages the loop 35 of the slide 34 and thus pivots lever 38 downwardly so as to push the tonearm mechanism 39 upwardly or the roller 37 is in alignment with the loop portion 36 so as to permit the roller to move upwardly thus pivoting the lever 38 in an opposite direction so as to lower the tonearm mechanism. Accordingly, the stylus on the tonearm will engage a record beneath the tonearm or one above it depending upon the selection made by means of switch 14 controlling the direction of rotation of the motor 5 and thus the direction of rotation of the friction wheel 29 reciprocating the slide 34 cooperating with the roller 37 and lever 38 in the manner described.

When the disc 29 engages the friction wheel portion 28 on a peripheral point lying along its greatest radius, the latch 43 engages the stop pin 42 and limits the traverse movement of the lever 31 in the direction of the arrow A. The engagement of the pin 42 and the ratchet 43 relieves the bearing contact pressure of the disc 29 against the friction wheel portion 28 to such an extent that the disc 29 ceases to rotate.

The movement of the tonearm 40 along the record disc is controlled by the tracking of the needle or stylus in the record disc sound grooves. When a record is being played the tonearm is permitted to move or pivot so as to conform to or track the grooves because the pin 48 is freely movable in the longitudinal groove 49 of lever 31. When the tonearm has reached the end of a sound track or sound groove of the record disc being played, the leg 44 of the lever 46 engages the rockable latch 43 engaging stop pin 42 rocking the latch upwardly so as to permit the spring 41 to urge the lever 31 in a direction shown by the arrow C. This movement of the lever 31 causes the disc 29 to bear against the friction wheel portion 28 so as to rotate the disc 29 thus positioning the lever 31, the slide 34 and the tone arm again in starting position.

While a preferred embodiment of the invention has been illustrated and described, it will be understood that the invention is in no way limited to this embodiment and that many changes may be made within the spirit and scope of the invention as defined by the following claims.

What I claim and desire to secure by Letters Patent is:

1. In a record changer the combination comprising, a rotatable column provided with three peripheral, circumferentially spaced grooves, a record disc holder rotatable with the column having three rods slidably guided in said grooves, and freely movable axially on the column, a turntable carried by said last mentioned means and movable axially on the column therewith, a tonearm movable into at least one playing position for playing the records on the turntable, means to support a stack of records on the column above the turntable comprising a release mechanism for releasing the records individually and sequentially to allow them to drop by gravity on to the turntable, said record holder including means on opposite ends of said rods for cooperating with an uppermost record on said stack of records and for supporting and automatically lowering the turntable stepwise a distance equal to the thickness of the individual records sequentially delivered to the turntable and in synchronism with the delivery of a record to the turntable.

2. In a record changer according to claim 1, in which said means on said rods comprise two projections on each rod substantially normal to the longitudinal dimension of each of said rods, and one of said projections overlies at least a portion of the uppermost of the records on the stack so as to form said means cooperating with the uppermost record and the other projection supports the turntable and the played records whereby the weight of the turntable and the played records thereon constantly bears on the uppermost record of said stack of records.

3. In a record changer according to claim 1, including means for rotating the column in opposite directions comprising, a drum fixed to said column and frictionally engaging said pair of friction wheels, a driven pinion selectively driven in opposite directions internally of said drum a pair of friction wheels frictionally engaging the interior of said drum, means biasing the friction wheels into constant engagement with the pinion.

References Cited in the file of this patent

UNITED STATES PATENTS

| | | |
|---|---|---|
| 1,438,000 | Underhill | Dec. 5, 1922 |
| 2,665,134 | Giannelli | Jan. 5, 1954 |

FOREIGN PATENTS

| | | |
|---|---|---|
| 647,416 | Great Britain | Dec. 13, 1950 |